(12) United States Patent
Bonifas et al.

(10) Patent No.: US 10,820,656 B2
(45) Date of Patent: Nov. 3, 2020

(54) REMOVABLE FOOTWEAR DEGRADATION SENSOR READER

(71) Applicant: 3M INNOVATIVE PROPERTIES COMPANY, St. Paul, MN (US)

(72) Inventors: Andrew P. Bonifas, Alberta (CA); Brock A. Hable, Woodbury, MN (US); Nicholas T. Gabriel, Woodbury, MN (US); Ronald D. Jesme, Plymouth, MN (US); Nicholas G. Amell, Burnsville, MN (US); Kristy A. Jost, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 268 days.

(21) Appl. No.: 16/073,886

(22) PCT Filed: Jan. 19, 2017

(86) PCT No.: PCT/US2017/014069
§ 371 (c)(1),
(2) Date: Jul. 30, 2018

(87) PCT Pub. No.: WO2017/136147
PCT Pub. Date: Aug. 10, 2017

(65) Prior Publication Data
US 2019/0037962 A1  Feb. 7, 2019

Related U.S. Application Data

(60) Provisional application No. 62/291,174, filed on Feb. 4, 2016.

(51) Int. Cl.
*A43B 3/00* (2006.01)
*A43B 1/08* (2006.01)
(Continued)

(52) U.S. Cl.
CPC .......... *A43B 3/0005* (2013.01); *A43B 1/0081* (2013.01); *A43B 1/08* (2013.01);
(Continued)

(58) Field of Classification Search
CPC ............ G05B 19/4183; G05B 19/4184; G05B 19/41845; G05B 19/4185;
(Continued)

(56) References Cited

U.S. PATENT DOCUMENTS 5,918,502 A * 7/1999 Bishop ............... A43B 3/0005
36/136
6,087,926 A    7/2000 Hajianpour
(Continued)

FOREIGN PATENT DOCUMENTS

CN    203491375    3/2014
TW    201315400    4/2013
(Continued)

OTHER PUBLICATIONS

Chambon, "Aging of Running Shoes and its Effect on the Mechanical and Biomechanical Variables: Implications for Runners", Journal of Sports Sciences, 2014, vol. 32, No. 11, pp. 1013-1022.
(Continued)

*Primary Examiner* — Vinh P Nguyen
(74) *Attorney, Agent, or Firm* — X. Christina Huang; Sriram Srinivasan

(57) ABSTRACT

A shoe degradation sensor assembly includes a first sensor disposed in or proximate to a material layer of a shoe between a foot space and an outer surface of the shoe, and an electrical contact assembly operable to removably electrically connect the shoe degradation sensor assembly to a reader. The material layer changes in at least one physical property with degradation to the shoe, and the first sensor is configured to indicate the changing physical property of the
(Continued)

material layer thereby indicating a degree of degradation to the shoe.

13 Claims, 9 Drawing Sheets

(51) Int. Cl.
*A43B 1/00* (2006.01)
*A43B 5/06* (2006.01)
*G01B 7/16* (2006.01)

(52) U.S. Cl.
CPC .................. *A43B 5/06* (2013.01); *G01B 7/22* (2013.01); *G01B 2210/58* (2013.01)

(58) Field of Classification Search
CPC ........... G05B 2219/32287; G05B 2219/37351; G05B 2219/37434; G05B 23/0221; G05B 23/0289; G05B 23/0294; G05B 23/0297; G01R 31/00; G01R 29/0878; G01R 27/16; G01R 33/341; G01R 33/3415; A43B 3/0005; A43B 5/06; A43B 17/00; A43B 1/0054; A43B 10/81; A43B 1/08; G01B 2210/58; G01B 7/22; G01D 5/243
See application file for complete search history.

(56) References Cited

U.S. PATENT DOCUMENTS

| | | | |
|---|---|---|---|
| 6,160,254 A | 12/2000 | Zimmerman | |
| 6,360,597 B1* | 3/2002 | Hubbard, Jr. | A43B 3/00 73/172 |
| 7,277,021 B2 | 10/2007 | Beebe | |
| 8,581,731 B2* | 11/2013 | Purks | A61B 5/1038 340/573.1 |
| 10,172,423 B2* | 1/2019 | Walker | A43B 3/0031 |
| 2006/0152377 A1 | 7/2006 | Beebe | |
| 2007/0033838 A1 | 2/2007 | Luce | |
| 2008/0191693 A1* | 8/2008 | Jones | G01D 21/00 324/238 |
| 2013/0139605 A1 | 6/2013 | Burke | |
| 2014/0062703 A1 | 3/2014 | Purks | |
| 2015/0018721 A1 | 1/2015 | Wang et al. | |
| 2015/0077094 A1 | 3/2015 | Baldwin | |

FOREIGN PATENT DOCUMENTS

| | | |
|---|---|---|
| WO | WO 2007-047889 | 4/2007 |
| WO | WO 2010-117597 | 10/2010 |
| WO | WO 2016-195939 | 12/2016 |
| WO | WO 2017-069969 | 4/2017 |

OTHER PUBLICATIONS

Shorten, "The 'Heel Impact' force peak during running is neither 'heel' nor 'impact' and does not quantify shoe cushioning effects", Footwear Science, Mar. 2011, vol. 3, No. 1, pp. 41-58.

International Search Report for PCT International Application No. PCT/US2017/014069, dated Apr. 28, 2017, 5pgs.

Notification of Grant of Invention Patent dated Aug. 31, 2020, issued by the China National Intellectual Property Administration in China Patent Application No. 201780009945.1.

* cited by examiner

REMOVABLE FOOTWEAR DEGRADATION SENSOR READER

CROSS REFERENCE TO RELATED APPLICATIONS

This is a national stage filing under 35 U.S.C. 371 of PCT/US2017/014069, filed Jan. 19, 2017, which claims priority to U.S. Provisional Application No. 62/291,174, filed Feb. 4, 2016, the disclosure of which is incorporated by reference in its/their entirety herein.

FIELD

The invention relates generally to footwear, and more specifically to a removable footwear degradation sensor reader.

BACKGROUND

Modern footwear is typically designed to meet several goals, based on factors such as the intended use of the shoe and a desired cost of the shoe. In a typical example, a shoe might be designed to be as light as is practical for its particular use, provide sufficient traction under a variety of conditions, and protect the foot of the wearer from the ground. The shoe may further be designed to provide other functions, such as to protect a user from rain or cold, present a stylish appearance suitable for a particular activity, or protect an athlete from physiological risks associated with various activities.

Running shoes, for example, are typically designed to be lightweight to enhance a runner's speed, while providing good ventilation for the user's foot through use of breathable fabrics in constructing the upper portion of the shoe. The lower portion of the running shoe, or sole, typically provides good traction for athletic movement, while also providing cushioning to lessen the effects of the user's foot repeatedly striking the ground. Modern running shoes often have soles made up of a variety of components to achieve these goals, including a footbed on which the foot sits, an insole under the footbed used to attach the sole to the shoe's upper, a midsole made up of a cushioning material such as a polymeric foam designed to cushion impact resulting from running, and an outsole of a harder rubber material designed to provide good traction with the running surface while providing long tread life.

Each of these components of a running shoe's sole is also constructed with various design goals and tradeoffs taken into consideration. The footbed, for example, may be designed to control moisture or odor, provide cushioning, provide arch support or other position control, or perform other functions depending on the user's particular needs. The outsole may be designed to provide good grip, such as through use of rubber having good frictional properties or spikes, while providing a long wear life. The midsole may similarly be designed to provide cushioning, provide a specific rise from the toe to the heel of the shoe, and provide stability for the user's foot, all while providing a long useful life for the wearer.

In the midsole, the material absorbs 2-3 times the user's body weight during impact in a typical stride, with many hundreds of such impacts per mile run. The midsole material is therefore typically formed of a material that can provide cushioning under repeated high impacts over a long period of time, such as EVA (ethylene vinyl acetate) or PU (polyurethane) foams. Although there are tradeoffs between the various materials used for midsole construction, most midsole materials that provide good cushioning also undergo varying degrees of what is termed "compression set" or flattening with repeated use. For example, EVA foams provide good cushioning and rebound but are somewhat prone to compression set, while PU foams are somewhat more resistant to compression set but provide less cushioning and rebound and are heavier.

Because the cushioning and rebound properties of the shoe often degrade before there is significant wear to the shoe's upper, a pair of shoes may not appear to be worn out despite having significant compression set and loss of cushioning and rebound. Many running shoe users therefore try to estimate when their shoes have lost enough of their ability to provide cushioning or rebound to warrant replacing the shoe with new shoes. This is often done by tracking the number of miles run in a particular pair of shoes, how many weeks or months a particular pair of shoes has been used, or other such methods.

But, such methods don't account for variations in user weight, running surface, stride, or other factors that can significantly affect the effective life of the shoe. Such rules-of-thumb also don't account for differences between shoe materials, midsole thicknesses, or other characteristics of different shoes that contribute to variations in their useful lives.

Because the ability of a running shoe to provide cushioning and rebound to a runner are important factors in the shoe's ability to protect the runner from injury and provide an enjoyable running experience, it is desirable to more accurately determine degradation such as compression set in shoes.

SUMMARY

One example embodiment of the invention comprises a shoe degradation sensor and a shoe degradation sensor reader. The shoe degradation sensor reader comprises a contact assembly configured to removably electrically couple to the shoe degradation sensor disposed in or proximate to a material layer of the shoe that changes in at least one physical property with degradation to the shoe. The shoe degradation sensor is further configured to indicate the at least one physical property of the material layer, thereby indicating a degree of degradation to the shoe. The shoe degradation sensor reader comprises a reader module operable to query the first sensor via the contact assembly, and to measure the at least one physical property of the material via the first sensor. The shoe degradation sensor reader further includes a communication module operable to communicate the measurement of the at least one physical property of the material from the reader module to an electronic device.

In a further example, the shoe degradation sensor comprises an LC tag having a resonant frequency that indicates the physical property, and querying the first sensor via the reader module comprises sweeping a frequency source energizing the first sensor and observing at least one of a voltage peak or an impedance peak of the first sensor to identify the resonant frequency.

In another example, a method of determining degradation of an article of apparel includes removably coupling a reader module to a first sensor embedded in or proximate to a material layer of the article of apparel, where the physical property of the material layer changes with degradation to the article of clothing. The at least one physical property is measured via the reader module, thereby measuring a degree of degradation to the article of apparel. In further examples, removably coupling comprises coupling using at least one of compliant inductive coupling, compliant metallized hook-and-loop, mechanical spring, conductive adhesive, and compliant anisotropic conductive adhesive electrical contacts In another example, the article of apparel comprises one of a shoe, a medical brace, sporting equipment, and a wrap.

The details of one or more examples of the invention are set forth in the accompanying drawings and the description below. Other features and advantages will be apparent from the description and drawings, and from the claims.

DETAILED DESCRIPTION

Figure 1:
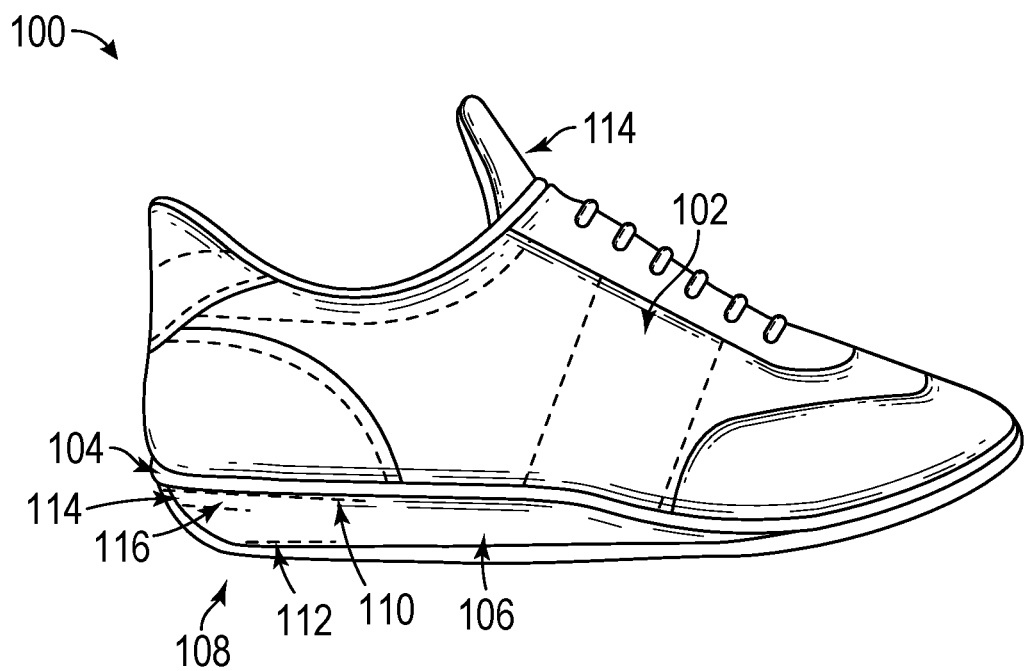
FIG. 1 shows a running shoe incorporating a degradation sensor having a connector removably couplable to a sensor reader.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Footwear such as athletic shoes are often constructed not only to protect the foot from contact with the ground, but to provide support and cushioning to the foot to enhance a user's ability to perform various tasks such as running, jumping, and moving with agility. The outsole of such a shoe is typically constructed to provide grip with a particular surface, such as a gym floor or an outdoor track. The midsole is similarly constructed to provide support for lateral movement, cushioning for running or jumping movements, and may provide other features specific to the shoe's application. Because the effectiveness of such features can diminish as the shoe material degrades, it is desirable to ensure that degradation of shoes in ways that might affect various performance characteristics can be monitored and measured.

A running shoe, for example, typically absorbs 2-3 times the user's body weight during impact in a typical stride, with many hundreds of such impacts per mile run. The shoe's midsole undergoes some degradation with each impact, based on factors such as the running surface, the user's stride, the user's weight, and the size of the shoe. This results in "compression set" or flattening of the cushioning material used to construct the midsole, reducing the material's ability to cushion the impact of each running stride. Because high-performance footwear such as running shoes often undergo significant degradation of the midsole and a corresponding reduction in cushioning performance before there are visible signs of wear to the shoe, it is often difficult to estimate when a shoe should be replaced. Methods such as estimation of the number of miles run in a particular pair of shoes are the predominant method of estimating the useful life left in a running shoe, but such methods generally don't account for variations in stride between users, variations in user weight, shoe size relative to the user's weight, or other factors that can significantly affect the rate at which degradation such as compression set of the midsole occur. Further, different shoes may have significantly different degradation characteristics, such as where different materials are used in the outsole, or different thicknesses of various materials are used in constructing different shoe models.

Some solutions are presented in U.S. Patent Application No. 62/245,034, titled "Wearable End of Life Sensor for Footwear," which is hereby incorporated by reference as example embodiments in which this invention may be practiced. The examples described in the application provide for improved measurement, estimation, or characterization of degradation of material in a shoe, such as measuring compression set in a shoe's midsole by measuring one or more physical properties of the midsole that are related to degradation of the midsole material. In one such example, the distance between an LC resonator and a conductive element disposed in or on the midsole is determined by measuring a resonant property of the LC resonator using an external measurement device. In other examples, other such changes in physical properties of a material, such as a midsole, insole, or padding in the shoe's upper, are measured using other methods. But, challenges remain in accurately and efficiently querying the sensors configured to measure the shoe's physical property, such as determining the resonant frequency of an LC resonator embedded within a shoe's midsole.

Some embodiments presented herein therefore provide for reading a degradation sensor in a shoe or in other clothing by removably attaching a contact assembly of a sensor to a contact assembly of a degradation sensor reader, where the reader is operable to both query the degradation sensor and communicate information related to a measurement of a physical property taken by querying the shoe degradation sensor to another electronic device such as a smartphone or other computerized system. In some further examples, the contact assembly is mechanically compliant, allowing the shoe or other clothing item to be worn and to move while the degradation sensor reader is installed.

FIG. 1 shows a running shoe incorporating a degradation sensor having a connector removably couplable to a sensor reader. Here, a running shoe shown generally at 100 is constructed of an upper 102 that is constructed to contain a user's foot, and a sole made up of an insole 104, a midsole or wedge 106, and an outsole 108. The insole 104, the midsole 106, and the outsole 108 are separate layers, typically made of separate materials, and are attached to one another such as with an adhesive to form the sole of the shoe. The insole 104 attaches the sole to the shoe upper, while the midsole 106 provides cushioning and elevates the heel slightly above the toe when the user is wearing the shoe. The outsole 108 is made of a rubber material that is harder than the midsole, and provides traction and long wear life for the shoe.

In this example, a degradation sensor is also integrated into the shoe, such as an LC tag 110 that is operable to resonate at a specific frequency and with a specific quality factor (Q) when energized by an external RF energy source. The LC tag in this example is attached to the outer surface of the midsole 106 before the midsole is attached to the insole 104, but in other examples will be otherwise disposed near or in the midsole 106. A conductive element 112 is similarly disposed on the outer surface of the midsole 106 before the midsole is attached to the outsole 108, thereby embedding the conductive element 112 between the midsole and the outsole when the midsole and outsole are attached. The conductive element 112 is in various examples electrically conductive, magnetically conductive, or electrically and magnetically conductive.

A shoe pocket 114 provides a user access to a contact assembly 116 that is electrically coupled to the LC tag 110. The connector assembly is therefore operable to electrically couple a reader device to the LC tag 110, enabling a user to use the reader device to query the LC tag 110 to determine the degree of degradation to the shoe's midsole 106.

As the midsole 106 material degrades, such as by repeated compression as a result of a user running, by heat, by age, and by other such factors, various physical characteristics of the midsole are likely to change in a measurable way. For example, the midsole 106 in this example undergoes a flattening or compression set as a result of the repeated impacts, and is no longer able to fully rebound or recover to its original shape. This change in the midsole material affects the distance between the LC tag 110 and the conductive element 112, causing the LC tag 110 to change in resonant frequency and quality factor, and potentially in other measurable characteristics.

The LC tag 110 can therefore be energized such as using an reader device coupled via contact assembly 116, and the resonant frequency or other resonant characteristic of the LC tag measured, to provide an indication of the distance between the LC tag and the conductive element 112. This indication can then be compared to a reference or expected indicated value to determine whether a maximum allowable degree of compression set is detected, thereby indicating that the shoe is not performing within established performance guidelines and should be replaced. In one such example, the LC tag resonant frequency is compared to a target resonant frequency for the particular model of shoe, based on knowledge regarding the shoe model's initial geometry, materials, and performance guidelines. In another example, a baseline indication is taken for each shoe when new and is recorded, such that the baseline LC tag resonant frequency can be compared against LC tag resonant frequency measurements taken after the shoe has been used, to indicate the degree of change or compression set in the shoe since it was new.

In another example, another resonant characteristic of the LC tag 110, such as the quality factor (Q) or other resonant characteristic of the LC tag is measured, and is used to indicate a change in distance between the LC tag and the conductive element 112. The quality factor of a resonant circuit such as an LC tag is derived from the frequency breadth or bandwidth over which the tag resonates relative to its center resonant frequency. As the LC tag 110 of FIG. 1 moves closer to the conductive element 112, the Q of the circuit will decrease as the resonance bandwidth increases, providing an indication of the distance between the LC tag and the conductive element. The LC tag in these examples is a passive device in that it does not provide power or provide power gain, resulting a reduced cost over typical active devices such as transistors, integrated circuits, and other semiconductor devices.

The LC tag 110 and the conductive element 112 are in this example placed on opposite sides of the midsole 106 foam layer, such that the distance between the LC tag and the conductive element reflects the thickness of the entire layer at a desired location within the shoe, such as under the user's heel. The heel location for the LC tag and conductive element is chosen in this example because the midsole typically experiences the greatest forces directly under the heel, and the midsole is typically therefore thickest under the heel. Degradation of the midsole under the heel will therefore also have the greatest impact on perceived cushioning ability to a user, making the heel a good location for degradation measurement. In other examples, the LC tag, the conductive element, or both may be positioned embedded within a layer, embedded in different layers, sandwiched between different layers, or otherwise configured to measure part of a layer, all of a layer, or multiple layers of a shoe.

In one such example, a shoe comprises layers of EVA (ethylene vinyl acetate) and polyurethane in the midsole, such that the more dense polyurethane foam materials are used to provide structure and support around the heel and arch and the relatively softer EVA foam is used to provide cushioning and rebound. The EVA foam layer is more prone to compression set, but provides significantly better cushioning and rebound or energy storage characteristics than the polyurethane foam. Some examples therefore will use a degradation sensor such as LC tag 110 and conductive element 112 to measure compression in one layer of foam, such as the EVA layer, while not measuring another layer, such as a polyurethane layer, based on the different characteristics of the layers used to form the shoe's sole. In other examples, other layers and materials such as composites, cloths, and the like may be included in shoe construction, and included or excluded from degradation sensing. A shoe incorporating a gel layer, for example, may use the gel layer to provide cushioning such that its thickness is an important indicator of shoe performance, and may elect to measure or not measure the thickness of the gel layer depending on whether construction of the shoe results in the gel layer becoming thinner or otherwise degrading with wear to the shoe. In other examples, the shoe material comprises ethylene vinyl acetate, polyurethane, polymeric foam, rubber, nylon, fabric, gel, adhesive, polychloroprene, thermoplastic resin, thermoset resin, or air, or a combination including two or more of these elements.

Although the example illustrated in FIG. 1 measures compression set in a midsole foam material that is primarily responsible for providing cushioning and rebound to a user while running, other examples include measurement of degradation of different parts of the shoe. A cushioned shoe tongue 114, for example, can also incorporate a degradation sensor such as the LC tag 110 and conductive element 112 on opposite sides of the shoe tongue's foam cushioning material, such that measurement of the resonance of the LC tag indicates a degree of compression set or other degradation of the tongue's foam cushioning material. Degradation sensors are similarly used to measure material degradation in other parts of the shoe in other examples.

Degradation is determined by an observed degree of compression set in the foam midsole 106 in FIG. 1, which is characterized as the degree to which the midsole 106 material does not fully rebound to its original size. For example, a foam midsole that is 0.5 inches thick when new, but which is now 0.4 inches thick, has experienced 20% compression set because it has lost 20% of its thickness due to repeated compressions. In this example, compression set is measured by determining the resonant frequency of LC tag 110, because the resonant frequency of the LC tag varies with the distance between the LC tag 110 and conductive element 112 such that as the midsole experiences compression set and the LC tag becomes nearer to the conductive element 112 with no force applied to the shoe, the resonant frequency of the LC tag increases. In a more detailed example, an LC tag has a resonant frequency of 10.25 MHz in a shoe configuration with no compression set such as that of FIG. 1. When the shoe's midsole is degraded to the point where it has 20% compression set, the LC tag will have a resonant frequency of 10.5 MHz, with frequency change and compression set varying relatively linearly between 0-20% compression set. If the shoe's useful life is considered to be 20% or less compression set, an observed LC tag resonant frequency of 10.5 MHz or greater would therefore indicate that the shoe's useful life has passed. Similarly, a resonant frequency between 10.25-10.5 MHz can indicate the degree of compression set the shoe has already experienced, such as where a user orders a new pair of shoes when the resonant frequency reaches 10.45 MHz, indicating the shoe is nearly worn out.

Because the degree of degradation or compression set in the example of FIG. 1 is determined based on a change in resonance of an LC tag from an expected or reference resonant characteristic, it is desirable in some examples to provide or store baseline LC tag resonance information with which to estimate a shoe's degradation. This information can be stored in the reader device, in a memory associated with the LC tag, or in another location that can be readily accessed by the reader or by an electronic device such as a smartphone that connects to the reader. In one such example, a memory associated with the LC tag contains a serial number or other identifying information for the shoe, which is associated with initial LC tag resonance information. The associated LC tag resonance information may be alternatively stored in the shoe, such as by writing to an memory embedded in the shoe. This enables storage of baseline information representing the measured physical characteristic or characteristics of each shoe, making determining the degree of degradation of the shoe by monitoring changes in the physical characteristic of the shoe more accurate.

A reader can query the LC tag 110 by exciting the tag with an external RF antenna and observing the current flowing through the RF antenna such that when the provided frequency matches the resonant frequency of a nearby LC tag the observed current will decrease, indicating the resonant frequency of the LC tag and the corresponding compression set of shoe material. But, accuracy of the RF reader depends on factors such as the reader being held a constant distance from the LC tag during a frequency sweep, on being able to locate the reader near enough the LC tag to observe a strong change in antenna current, and on lack of interference from a smartphone or other nearby electronic device that may be employed as part of the reader system.

The example of FIG. 1 therefore employs a direct electrical connection to the LC tag 110 via contact assembly 116, ensuring that the impedance between the reader and the LC tag remains low and relatively constant during the frequency sweep. In a more detailed example, a reader circuit electrically coupled to the LC tag conducts a frequency sweep while the voltage across the LC tag is observed, such that a voltage peak signifies a resonant frequency of the LC tag. Because the frequency sweep process measures resonant frequency of the LC sensor rather than impedance of the LC sensor, impedance variations in the range of 1000 Ohms or less do not significantly affect the observed voltage peak, making variations between 0-1000 Ohms insignificant to the LC tag query process.

A contact assembly such as 116 therefore need not provide a contact impedance near zero Ohms or that does not have some variation, but can employ contact assembly configurations that provide generally good conductivity, such as use of conductive hook-and-loop such as Velcro, anisotropic adhesives, and other such methods that may have a contact impedance that varies slightly or is in the tens or hundreds of Ohms.

Figure 2:
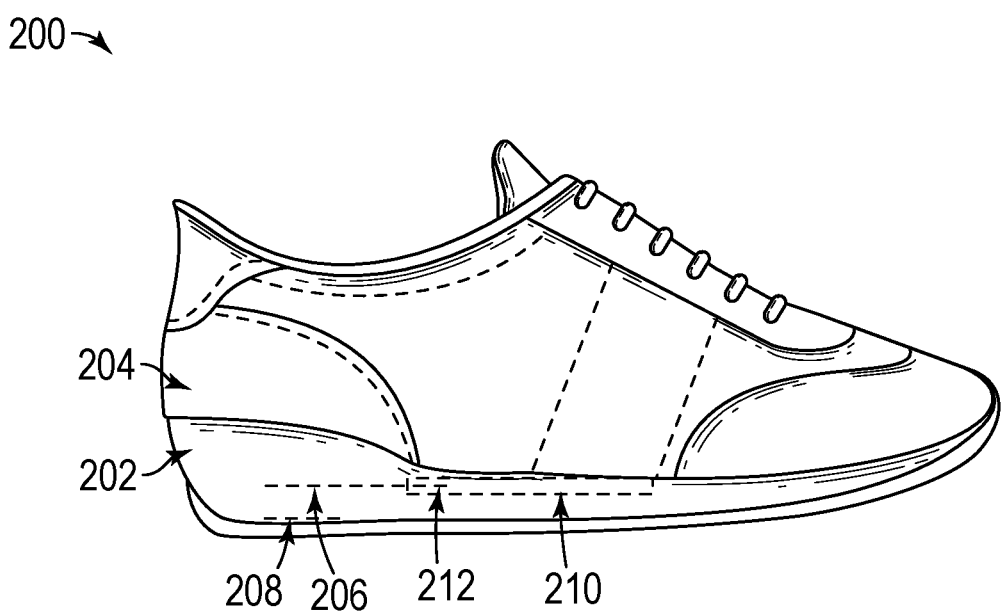
FIG. 2 shows an alternate running shoe incorporating a degradation sensor having a connector removably couplable to a sensor reader.

FIG. 2 shows an alternate running shoe incorporating a degradation sensor having a connector removably couplable to a sensor reader. Here, a running shoe 200 has a heel pocket 204 that is partially supported by a compression molded EVA midsole 202. The shoe also features an LC tag 206 and conductive foil element 208 that form a degradation sensor, and a pocket 210 configured to receive a degradation sensor reader. The degradation sensor reader is coupled to the LC tag 206 via a contact assembly 212, which extends into the pocket 210. A user can access the pocket 210 and connect a reader assembly to the LC tag via contact assembly 212 by removing a footbed from the shoe, exposing pocket 210 in the middle of the shoe near the arch, where relatively little compressive force is experienced during running.

The shoe of FIG. 2 comprises molded features such as a pocket 210 and supportive heel pocket 204 through use of compression molding EVA material in a pressurized mold to form the midsole. This process creates a thick skin on the outer surfaces of the midsole, which is more durable than EVA material in the body of the molded midsole and better resists degradation from abrasion and from water.

Figure 3:
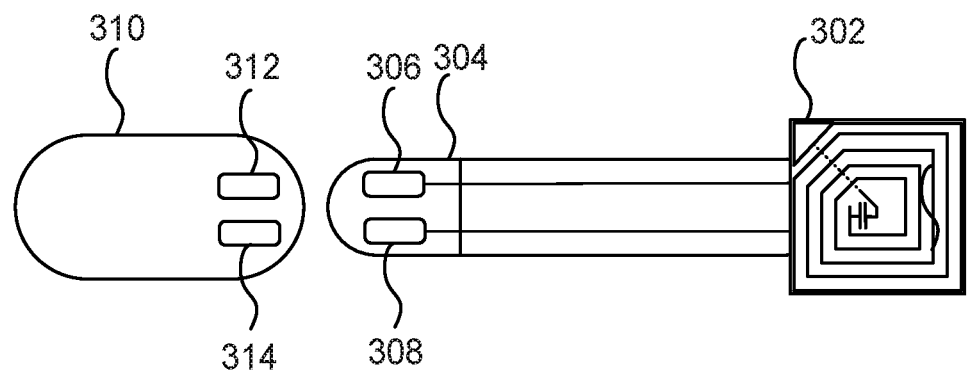
FIG. 3 shows a degradation sensor assembly comprising an LC tag and a conductive contact assembly.

FIG. 3 shows a degradation sensor assembly comprising an LC tag and a conductive contact assembly. Here, an LC tag assembly 302 is electrically connected to a contact assembly 304, which has two electrical contacts 306 and

308. The electrical contacts in various embodiments comprise different conductive materials arranged in various configurations, such as raised metallic contacts, conductive adhesive contacts, conductive mechanical fasteners such as snaps, or other such contact assemblies. A reader device 310 includes electrical contacts 312 and 314 that are configured to mate with the electrical contacts 306 and 308 coupled to the LC tag 302, thereby providing an electrical connection between the reader device 310 and the LC tag 302.

In a further example, the contact assembly 304 is further configured to mate in alignment with the reader device 310, such as by adding mechanical alignment features such as tabs, ridges, grooves, recessed or raised features, or the like that align the electrical contacts 306 and 308 of the contact assembly 304 with the electrical contacts 312 and 314 of the reader device 310. By ensuring that the contacts are aligned correctly, overlapping surface area of the contacts on the contact assembly 304 and reader device 310 is maximized, ensuring a consistent and reliable electrical connection.

Because contact impedance in the tens or hundreds of Ohms are acceptable in the examples presented here, in which the LC tag's resonant frequency rather than impedance is measured, the contacts 306, 308, 312, and 314 may be comprised of materials that are not ideal conductors in some examples, enabling selection of conductive materials that have other desirable qualities. In one such example, an anisotropically-conductive adhesive such as 3M brand Electrically Conductive Adhesive Transfer Tape 9703 may be used to coat the connector assembly 304, or electrical contacts 306 and 308, to ensure a reliable electrical connection to the reader device 310. The 3M 9703 tape is conductive from one side of the tape to the other, or perpendicular to the plane of the tape, such that a piece of 3M 9703 tape placed between the contacts on the connector assembly 304 and reader device 310 will not only hold the connector assembly and reader device together, but will conduct electricity between the properly aligned contacts on the connector assembly and reader device.

Figure 4:
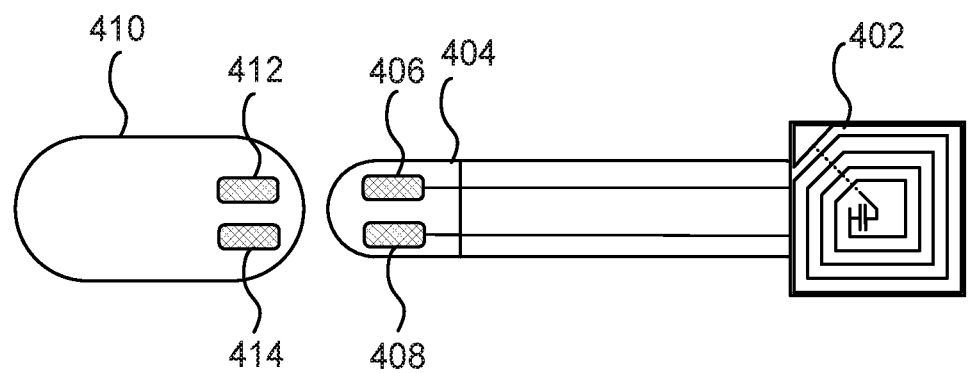
FIG. 4 shows a degradation sensor assembly comprising an LC tag and a hook-and-loop contact assembly.

FIG. 4 shows a degradation sensor assembly comprising an LC tag and a conductive hook- and loop contact assembly. Here, the LC tag 402 is coupled to a connector assembly 404 having conductive loop electrical contacts 406 and 408, while the reader device 410 has conductive hook electrical contacts 412 and 414. The conductive hooks in contacts 412 and 414 hook into the conductive loops of contacts 406 and 408 when pressed together, such that the contacts 406 and 408 become mechanically and electrically joined to electrical contracts 412 and 414. Hook and loop connectors such as that of FIG. 4 are often referred to as Velcro, which is a brand name of a hook and loop connector sold by Velcro Industries. Conductive hook and loop connectors are commercially available, such as silver-coated hook and loop connectors that are conductive on the order of one Ohm per square.

Figure 5:
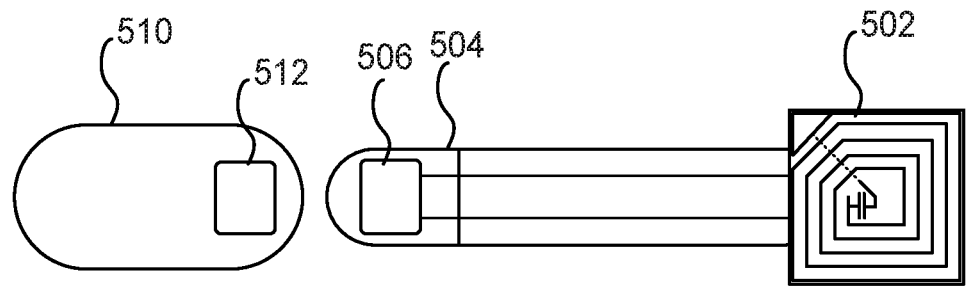
FIG. 5 shows a degradation sensor assembly comprising an LC tag and an inductive loop contact assembly.

FIG. 5 shows a degradation sensor assembly comprising an LC tag and an inductive loop contact assembly. Here, the LC tag 502 is coupled to a connector assembly 504 comprising an inductive loop 506. The reader device 510 comprises a corresponding inductive loop 512, configured to be positioned in close proximity to the inductive loop 506 of the connector assembly 504. Although the inductive loops 506 and 512 are not directly electrically coupled to one another, they are inductively electrically coupled such that a change in current in either one of the loops will result in a corresponding change in current in the other of the two loops when the inductive loops are placed in close proximity to one another. This configuration may be preferable in some environments where contact impedance may be affected by dirt or other environmental conditions, or in environments where repeated connection and disconnection of the contacts is required with minimal cost.

Although FIGS. 3-5 show a few examples of ways in which an electrical or electromagnetic connection may be established between a sensor assembly such as an LC tag and a reader device, a variety of other methods and apparatus are employed in alternate embodiments. Electrical connectors using pins and sockets are employed in one such example, while other examples include conductive snaps, friction connectors, and clamping connectors. Still other examples use conductive particle-loaded material such as rubber, or use mechanized connections such as pogo pins that are spring loaded to provide consistent contact. Each of these examples is operable to provide an electrical or electromagnetic connection having an impedance suitably small enough that variations in impedance will not affect a detected resonant frequency, which in various examples is below 100, 200, 500, 1000, 2000, 5000, or 10,000 Ohms. Many of these examples are also able in various configurations to provide a mechanically compliant electrical connection, such as by forming the contact assemblies of FIGS. 3-5 on a flexible substrate, making incorporation into a shoe or other article of clothing that may flex or bend with use more practical.

Figure 6:
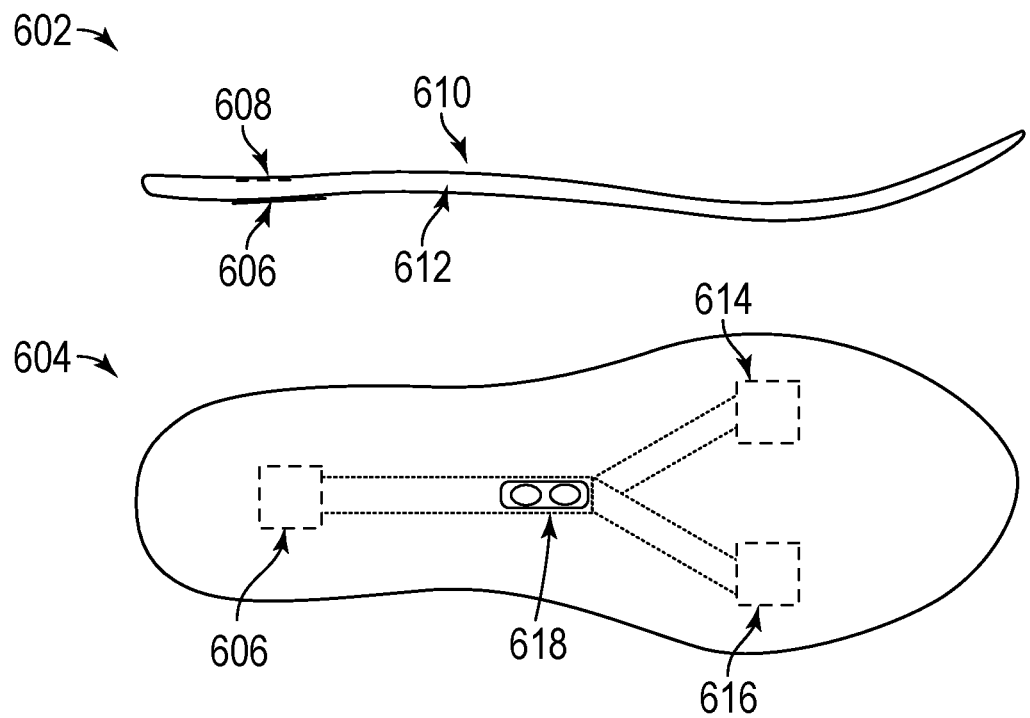
FIG. 6 shows degradation sensors incorporated into a removable shoe footbed.

Sensors such as those employed in these examples are incorporated in the shoe in some examples, but in other examples will be incorporated in another material such as a shoe's footbed, enabling a user to add degradation sensing capabilities to a shoe that is not manufactured with embedded sensors. FIG. 6 shows an example removable shoe footbed incorporating degradation sensors. Here, a footbed is shown from the side at 602 and from the top at 604. The footbed contains multiple degradation sensors such as an LC tag 606, which in this example is accompanied by a conductive element 608 attached to the opposite side of the footbed. The LC tag 606 is here attached to the bottom of the footbed such as with an adhesive, and the conductive element 608 is embedded under a fabric layer 610 on top of the footbed but above a foam layer 612 making up the bulk of the footbed's thickness.

The example of FIG. 6 also includes LC tag sensors 614 and 616, located near the toe area of the footbed. This provides for sensing of compression set in both the heel area using LC tag 606, and in the toe area using LC tags 614 and 616. The footbed also includes a contact assembly 618 in the arch area of the footbed, configured to facilitate attachment of a reader device. In some examples, separate electrical connections are provided from the connector assembly 618 to each of the LC tags 606, 614, and 616, while the example shown uses the same pair of conductors to connect a pair of electrical contacts in connector assembly 618 to each of the LC tags 606, 614, and 616.

Although a signal applied through the contact assembly will excite all three LC tags when the LC tags share a pair of conductors, the tags can be independently read if each tag is configured to have a different resonant frequency. In one such example, LC tag 606 has a resonant frequency of approximately 10 MHz, LC tag 614 has an initial resonant frequency of about 12 MHz, and LC tag 616 has an initial resonant frequency of about 14 MHz. A reader device coupled via connector assembly 618 will observe three different resonant peaks, even with significant compression set near one or more of the LC tags, as the LC tag resonant frequencies are selected to be farther apart than the typical frequency range of each LC tag assembly experiencing a normal range of compression set.

The footbed supplied with the shoe can be removed from the foot compartment of the shoe and replaced with the footbed as shown here, such that compression set of the footbed's foam can be determined by measuring the resonant frequency of LC tags 606, 614, and 616. Although degradation or compression set of the footbed may indicate when it is time to replace the footbed, in a further example it may further serve as an indication of degradation or compression set to the shoe, as compression set to the footbed and to the shoe will be correlated with one another. In a further example, additional sensors may be integrated into a shoe, such as on or within a midsole, or within a removable footbed as shown here.

Figure 7:
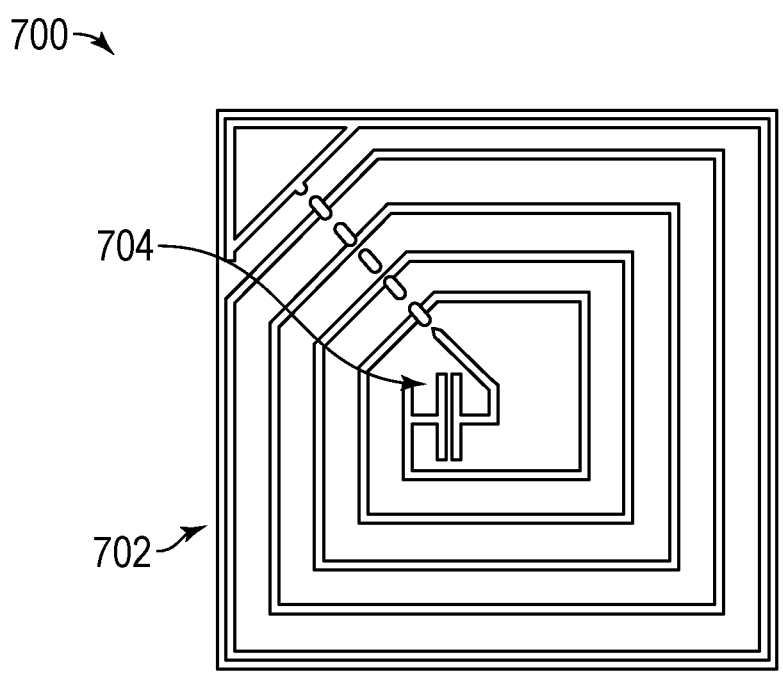
FIG. 7 shows an LC tag sensor assembly.

The degradation sensor in the examples presented here comprises an LC tag, such as is shown in FIG. 7. Here, an LC tag shown generally at 700 includes a conductive element that spirals around in a collapsing circular pattern to form an inductive element as shown at 702, which is coupled in parallel with a capacitive element as shown at 704. This inductive element coupled in parallel to a capacitive element forms an LC circuit, which has a resonant frequency based on the capacitance of the capacitive element and the inductance of the inductive element. More specifically, the LC circuit will resonate at $$f = \frac{1}{2\pi\sqrt{LC}}$$

where the frequency f of resonance is determined by the inductance L of the inductive element and the capacitance C of the capacitive element. As the LC tag moves closer to the conductive element in FIGS. 1, 2, and 6 as a result of increased compression set, the inductance of the inductive element 702 is reduced and the resonant frequency goes up.

The LC tag 700 is formed as a flat element, such as by adhering flat copper traces forming inductive element 702 to a backing material such as paper or plastic film. Capacitor 704 may be a small capacitor coupled in parallel with the inductive element 702, or may be similarly formed of flat copper traces in an alternate embodiment. A typical example LC tag may be an inch square but only a hundredth of an inch thick, such that the relatively flat construction enables the circuit to be easily embedded into or in between layers of a shoe. The relatively large inch square dimensions of the inductive element 702 in the LC circuit make energizing or exciting the LC circuit using external radio frequency source practical, particularly in embodiments where the LC tag is embedded in material or otherwise physically separated by significant distance from the radio frequency energy source.

Figure 8:
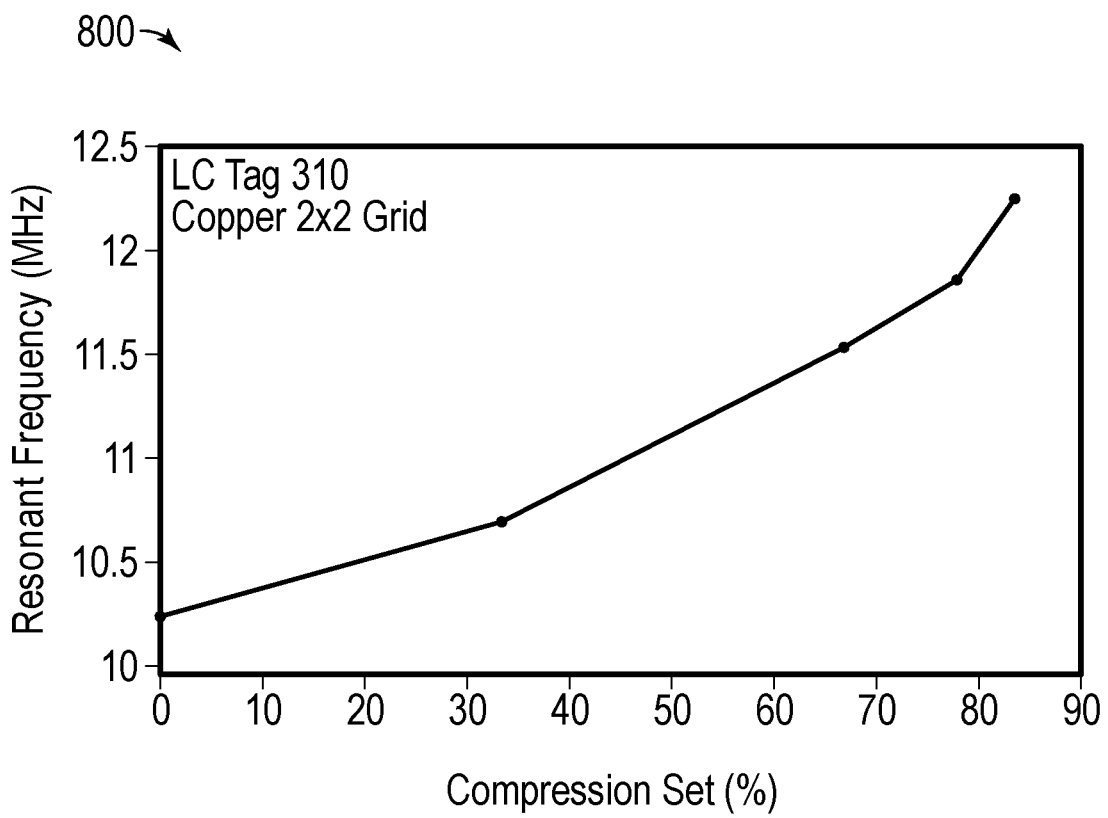
FIG. 8 is a graph illustrating how the resonant frequency of an example LC tag degradation sensor varies with compression set.

FIG. 8 illustrates how the resonant frequency of an example LC tag degradation sensor varies with compression set. When an LC tag such as that of FIG. 7 is incorporated into a shoe along with a conductive element such as is shown in FIGS. 1 and 2, compression set in the midsole is indicated by an increase in the resonant frequency of the LC tag as a result of a reduction in inductance of the inductive element of the LC tag. The reduction in inductance is a result of the conductive element moving nearer the flat inductive element 702 of the LC tag as shown in FIG. 7, and the conductive element's movement nearer the LC tag when the shoe is at rest is a result of compression set within the midsole of the shoe. As shown in FIG. 8, the LC tag exhibits a resonant peak at approximately 10.25 MHz when the shoe is new and there is no compression set. As the shoe degrades and the midsole undergoes compression set, the resonant frequency increases, such that the resonant frequency at 20% compression set is approximately 10.5 MHz. As shown in the chart, the relationship between compression set and resonant frequency of the LC tag is relatively linear when compression set is low, but becomes less linear as compression set increases. Because a shoe's useful life typically extends only to approximately 20% compression set, estimation of the amount of compression set in a shoe can therefore be accurately estimated using linear interpolation of the relationship between resonant frequency and compression set if the resonant frequencies corresponding to 0% and 20% compression set are known. For example, a shoe having a resonant frequency of 10.375 MHz can be estimated to have 10% compression set, or to have lost approximately 50% of its useful life, using such interpolation.

In other examples, a greater degree of compression set may be observed over the useful life of the material, such as when an LC tag and conductive element are configured to measure compression set in a removable footbed or padded shoe tongue. In such examples, a non-linear curve such as that of FIG. 8 may be used to estimate compression set in the footbed or tongue, as the useful life of the shoe may extend to 50% or greater compression set in the measured shoe element. In an alternate example, several data points are known, and piecewise-linear approximation or other such methods are used between known data points to estimate the compression set based on observed resonant frequency of the LC tag.

Figure 9:
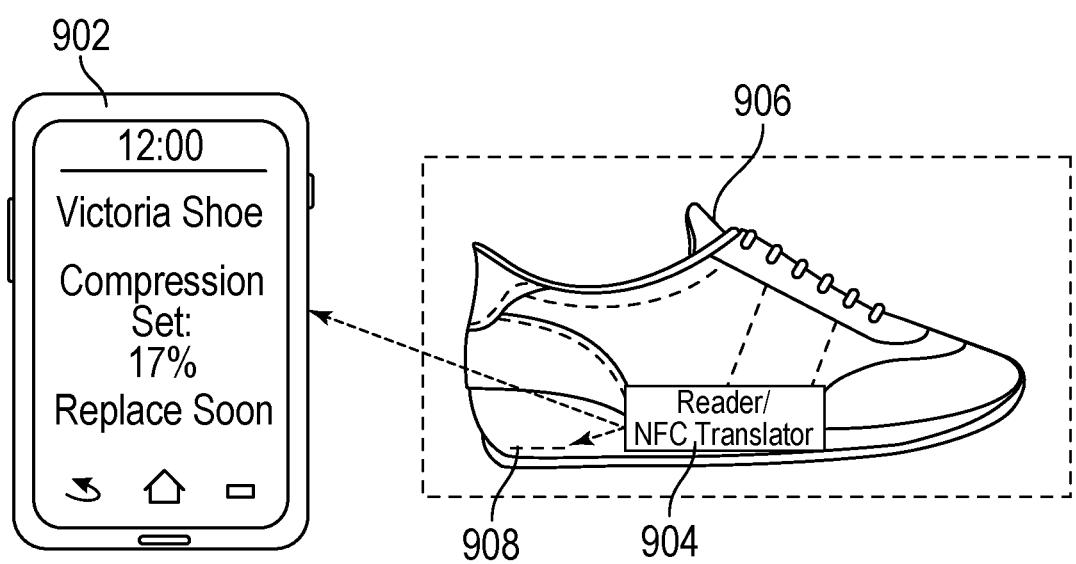
FIG. 9 shows an example system for reading the resonant frequency of an LC tag to determine compression set in a shoe.

FIG. 9 shows an example system for reading the resonant frequency of an LC tag to determine compression set in a shoe. Here, a user device such as a smartphone 902, tablet computer, or personal computer is used to communicate with a reader device 904. The reader device 904 is operable to communicate with the user's smartphone 902 using a standard communications technology such as Near-Field Communication (NFC) or Bluetooth, and is also operable to communicate with a shoe 906's degradation sensor 908 through an electrical or electromagnetic connection to the shoe's degradation sensor. In a more detailed example, the reader device 904 is removably coupled to the shoe and includes a resonant frequency detection circuit to query the LC tag that serves as a degradation sensor 908's resonant frequency, such as by providing radio frequency energy across a range of expected resonant frequencies and monitoring for returned energy at the same frequencies. When the reader device 904 determines the resonant frequency, it sends this information to the smartphone 902 via a wireless NFC connection, such that the smartphone is operable to receive the resonant frequency information and use known correspondence between observed resonant frequency and compression set as shown in FIG. 8 to present the user with information regarding the useful life of the shoe.

In this example, the smartphone 902 displays to the user the degree of compression set determined to be present in the shoe 906, and the smartphone provides a further indication of what the observed compression set measurement means regarding the useful life of the shoe by indicating that the shoe should be replaced soon. The correspondence between observed compression set to useful life of the shoe is further determined in this example using known characteristics of a particular shoe, which in this example is a Victoria shoe. In other examples, an estimate of useful life may be simply estimated based on compression set data for material typical to a type of shoe, such as EVA compression set in a running shoe.

In alternate examples, the smartphone or other user interface device is operable to provide feedback to a user through other methods, such as using audio, vibration, haptic feedback, or other such methods. The reader device 904 in alternate embodiments communicates with the smartphone 902 or other user interface device using wireless communication such as NFC, Bluetooth, ZigBee, WiFi, Cellular, or other wireless communication protocols, or through wired communication such as serial, parallel, USB, analog or digital signal, or other suitable wired communication protocols.

Although the reader device is shown here as being an element internal to the shoe such as is shown in FIG. 2, in other examples it may be external to the shoe, such as by being removably connected to electrical contacts coupling the degradation sensor 908 to the reader device 904, or may be integrated into or attached to the smartphone or other user device, or integrated into another device such as a store kiosk or other device providing a user interface.

Figure 10:
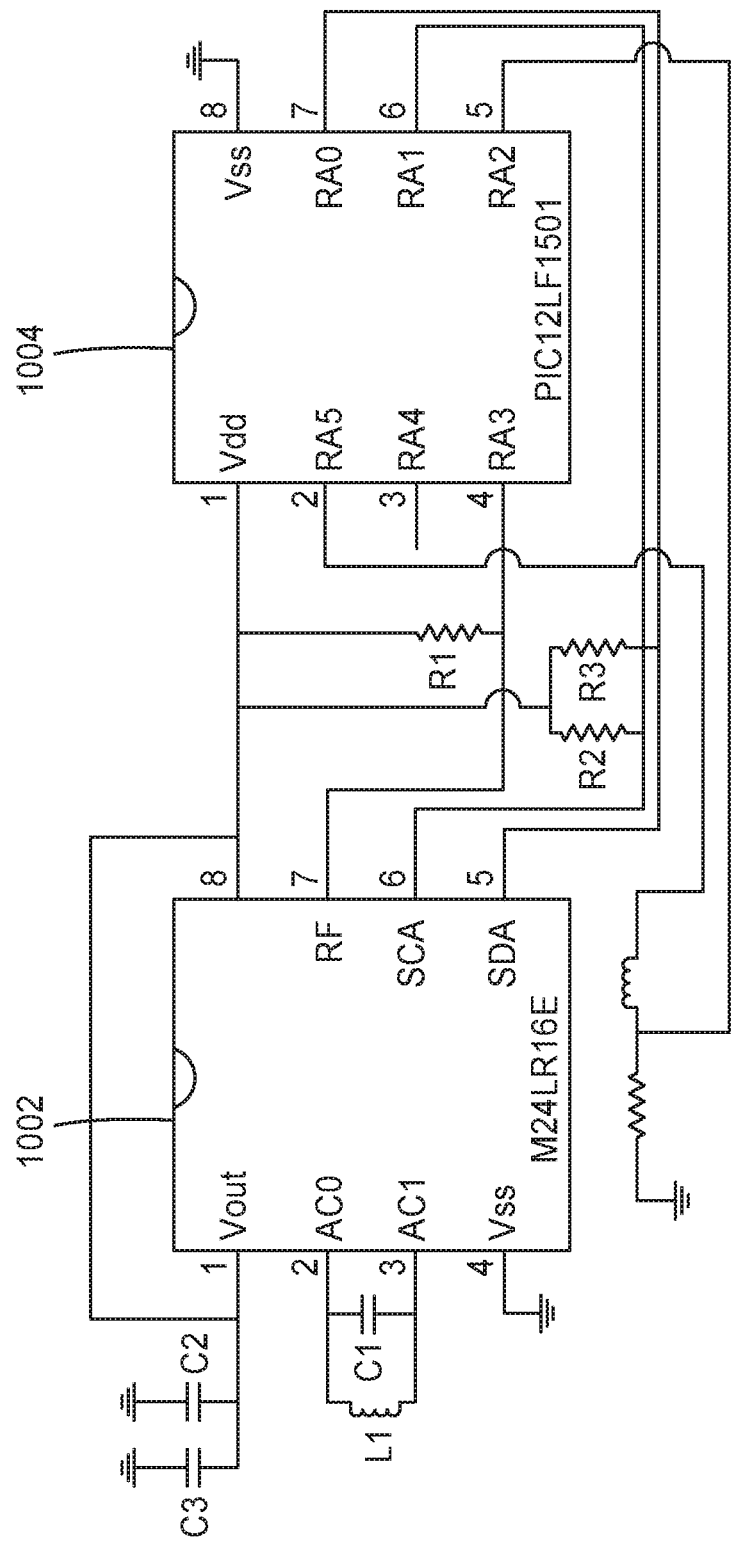
FIG. 10 shows an example reader device circuit operable to query a degradation sensor and provide an indication of the query result to a user device.

FIG. 10 shows an example reader device circuit operable to query a degradation sensor and provide an indication of the query result to a user device. Here, an integrated circuit 1002 is an ST Microelectronics M24LR16E NFC communications integrated circuit that is operable to communicate with a device such as a smartphone using the NFC protocol. The M24LR16E is further operable to harvest energy through a resonant inductive loop antenna coupled to pins AC0-AC1. Integrated circuit 1004 is a Microchip Technology PIC12LF1501 controller that is programmed to communicate with the M24LR integrated circuit, and to interrogate a degradation sensor element such as through conductors coupled to pins RA2-RA5 linking the circuit to the degradation sensor. In operation, a smartphone with an NFC communications module energizes the circuit through radio frequency communication with the resonant inductive loop antenna connected to the M24LR16E, and communicates with the M24LR16E integrated circuit using the wireless NFC protocol. The PIC12LF1501 device provides a variable frequency signal to the degradation sensor electrically coupled between pins RA2-RA5, and measures the corresponding current. When the provided frequency matches the resonant frequency of the coupled degradation sensor such as an LC tag the observed current will decrease, indicating the resonant frequency of the LC tag and the corresponding compression set of shoe material as described in prior examples.

A circuit such as that of FIG. 10 may in some embodiments be removably or permanently integrated into a shoe, enabling the shoe to act as an NFC communication device that is operable to communicate directly with a smartphone or other customer device. In one such example, a shoe element incorporating other electronic functions such as accelerometers to measure running distance, pace, or other characteristics incorporates an NFC degradation sensor reader circuit such as that of FIG. 10, and is operable to query the degradation sensor and communicate the sensor data and other information to a nearby device. In other examples, other technologies such as Bluetooth or wired connections are used to couple the degradation sensor to a reader device, or to couple a reader device to a user interface such as a computer, smartphone, or kiosk. The degradation sensor reader circuit such show in FIG. 10 is able to harvest power from the NFC signal provided by a device such as smartphone 902 of FIG. 9, but in other examples will be powered by a battery, by line power, by other power harvesting electronics, through other means, or through a combination thereof.

In many types of sensors, the impedance of the sensor varies with a change in a sensed property, and a reader device is used to read the impedance of the sensor and thereby determine the sensed property. But, such sensor/reader systems can be influenced by poor electrical connections between the sensor and the reader, particularly when the impedance of the connection is near or higher than the working impedance range of the sensor. Because the examples presented herein measure the resonant frequency of an LC tag degradation sensor, which varies with a change in inductance of the LC tag as shown in FIG. 8, the reader is significantly less sensitive to changes in impedance between the sensor and the reader.

Figure 11:
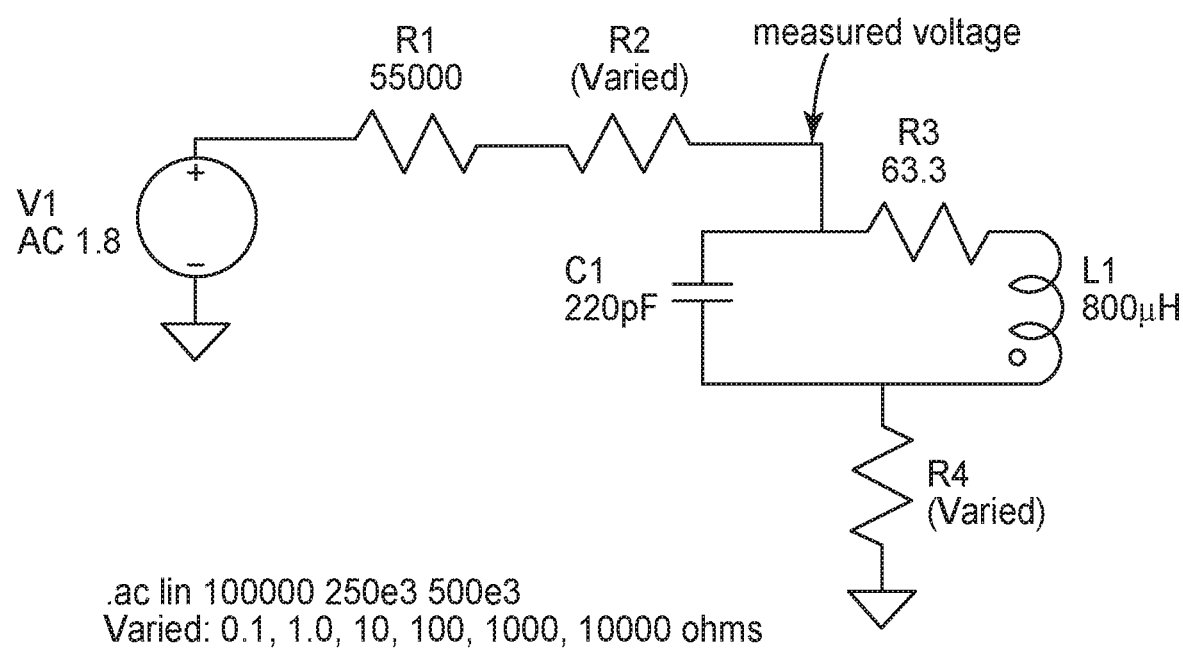
FIG. 11 shows a circuit modeling an LC tag sensor and a resonant frequency reader coupled by an electrical connection having variable impedance.

FIG. 11 shows a circuit modeling an LC tag sensor and a resonant frequency reader coupled by an electrical connection having variable impedance. Here, the impedance of the parallel LC circuit is designed to be in a range of 10 kilo Ohms to 200 kilo Ohms, such that the impedance of the LC circuit is high relative to the anticipated range of contact resistances between the LC tag and the reader device. This greatly reduces the effect that contact resistance between the LC tag and the reader device has on the total impedance of the circuit, minimizing the effect of contact resistance on the resonant frequency measurements.

Figure 12:
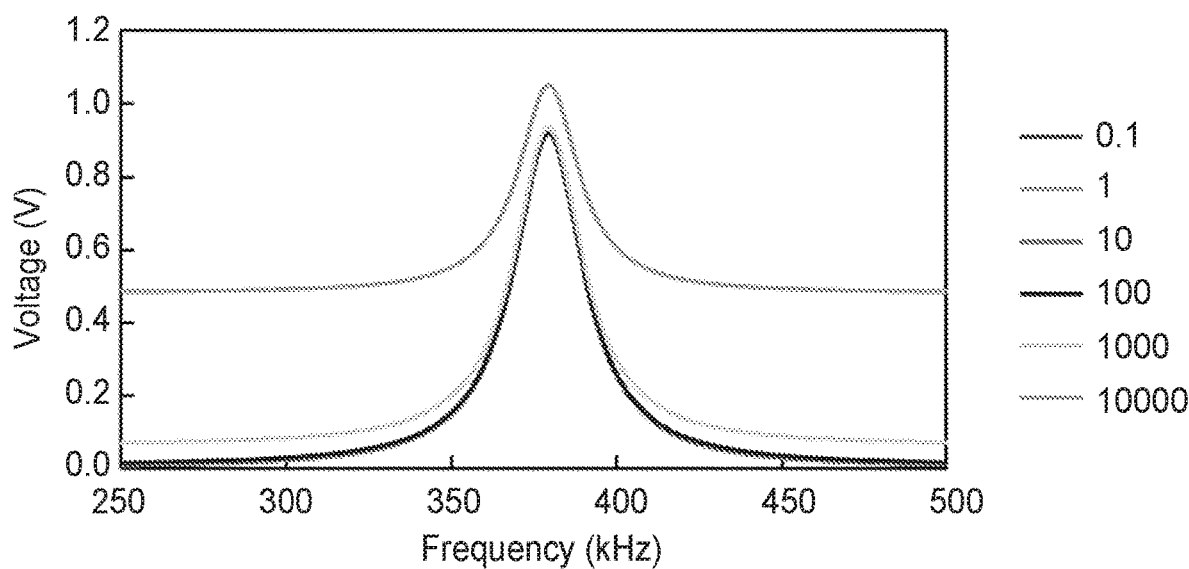
FIG. 12 shows measurement of the resonant frequency of the LC circuit of FIG. 11 using a frequency sweep from 250 kHz to 500 kHz, using different contact impedances.
Figure 13:
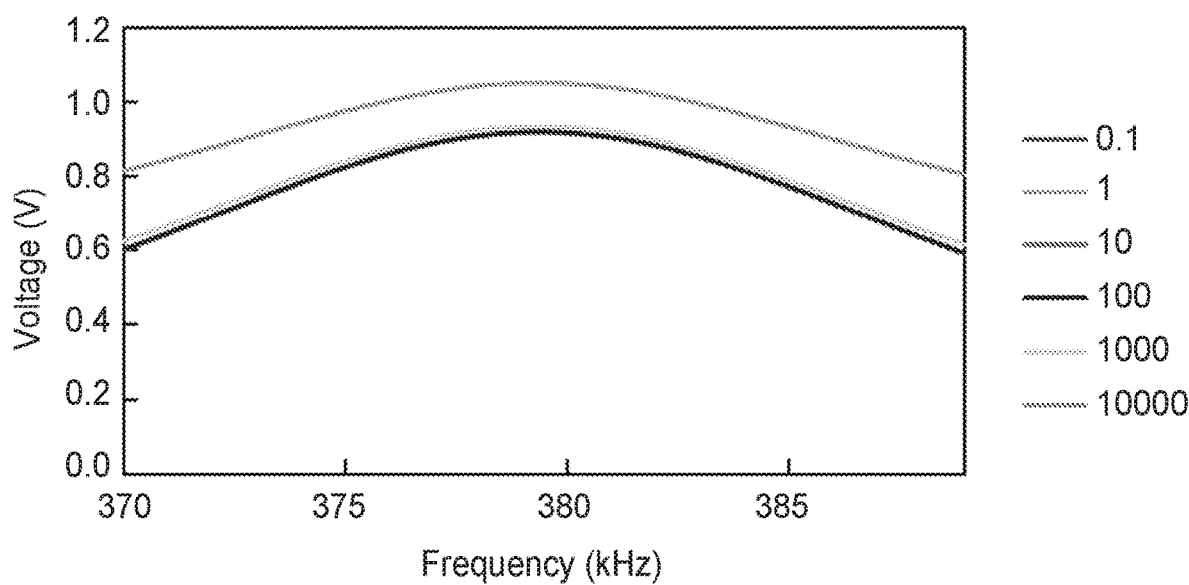
FIG. 13 shows measurement of the resonant frequency of the LC circuit of FIG. 11 using a frequency sweep from 370 kHz to 390 kHz, using different contact impedances.

As contact resistances R2 and R4 of FIG. 11 are varied from 0.1 Ohms to 10,000 Ohms, resonant frequency of the LC circuit is measured using a frequency sweep from 250 kHz to 500 kHz, as is shown in in FIGS. 12 and 13. FIG. 12 shows measured voltage versus frequency for a contact sensor, using contact impedances of 0.1, 1, 10, 100, 1000, and 10,000 Ohms. Because the resonant frequency of the LC circuit results in a higher observed voltage across the LC tag, the resonant frequency can be easily determined to be approximately 380 kHz from the graph of FIG. 11. FIG. 13 shows the same data as FIG. 12, but over a frequency range of 370 to 390 kHz, more clearly showing voltage variation with different contact resistances near the resonant frequency of the LC circuit.

As can be seen from the traces on the graph showing different contact impedances, the observed voltages near the resonant frequency of the LC circuit do not vary significantly with contact resistances between 0.1-100 Ohms, and vary relatively little between 0.1-1000 Ohms. This means that contact resistance variation in the range of 0-100 Ohms will not materially affect the accuracy of frequency measurement of the LC circuit, and contact resistance variation from 0-1000 Ohms will have only minimal effect on the accuracy of the measurement. As a typical frequency sweep such as that shown in FIG. 12 can be conducted in the range of hundreds of milliseconds or less, the resonant frequency measurement circuit is not sensitive to contact resistance variations from zero to one hundred Ohms or more during a time range of at least tens of milliseconds or more. This means that significant variation in contact resistance can be tolerated by the circuit of FIGS. 10-11 while maintaining very high accuracy, and can be tolerated even over very short time periods or very rapid changes in contact resistance within the range of 0-100 Ohms.

As a practical matter, if contact resistance is stable during the hundreds of milliseconds taken for a frequency sweep, the contact resistance will not have a significant impact on the measured resonant frequency. Also, if the contact resistance varies within acceptable ranges (such as 0-100 Ohms or 0-1000 Ohms) during the hundreds of milliseconds that the frequency sweep takes, measurement of the resonant frequency of the LC circuit will not be significantly affected. Because the LC circuit measurement circuit modeled here is not sensitive to impedance variations over at least several orders of magnitude, determination of the physical property measured by the LC tag is not sensitive to impedance variations, or dependent upon a low or non-varying contact impedance for accurate measurement.

Many of the examples presented here use a reader device electrically coupled to the LC tag to measure the resonant frequency of an LC tag to determine the degree of degradation or compression set in an item such as a shoe. Although there are advantages to measuring frequency of a sensor element, such as insensitivity to contact resistance between the sensor element and reader device, a variety of other degradation sensors are employed in other examples. In one such example, the degradation sensor comprises a thermometer and a heater element, operable to measure thermal conductivity of a shoe element such as an EVA midsole. The heater and thermometer may be separate or may be integrated into the same sensor element, such that a heater operates for a known time and a corresponding increase in temperature is measured at or over a known time to determine how rapidly heat is conducted through the shoe material. The amount of observed temperature rise where the heater and thermometer are located close to one another indicates the specific heat of the material, which can vary with things such as compression set, water absorption, or other forms of degradation. In examples where the heater and thermometer are spaced apart from one another in a shoe material, the observed increase in temperature indicates physical properties such as thermal conductivity or diffusivity of the shoe material, which also vary with degradation such as compression set, water absorption, or the like.

The heater is an example of an active or powered element in that it is electrically or galvanically coupled to a power supply, enabling it to produce heat. The power is supplied via a reader device, via a battery, or harvested via circuitry configured to capture RF or other energy in various examples. The LC tag incorporated into the degradation in other examples is in contrast a passive sensor, in that it does not contain a power-providing element or amplify power using active electronic devices like transistors or integrated circuits. The LC tag is therefore a passive sensor assembly, whereas a sensor with a heater, integrated circuit, or other such element is considered active. Similarly, the degradation sensors in various embodiments will be operable to provide information via radio frequency energy, such as the LC tag, or via a wired conductive connection, such as with a powered heater/thermometer combination. In some such examples, a reader or a power source may be integrated into the shoe, or may be removably integrated into the shoe.

Still other sensors will be configured in other examples to measure these or other physical characteristics of various materials, including measuring thickness, compression set, density, elongation, mechanical elasticity, water content, thermal conductivity, electrical conductivity, electrical permittivity, magnetic permeability, and other such characteristics. As various materials degrade with use, it is expected that these and other physical properties will vary in measurable ways, and can be indicated through use of various degradation sensor configurations to determine the degree of degradation of the various materials. For example, a mechanical resonator or vibrator may be able to provide an indication of density, mechanical elasticity, and other such characteristics of a shoe's sole material, and an RF coil may be able to provide an indication of electrical conductivity, electrical permittivity, magnetic permeability, or other such characteristics of a material, particularly where the material is embedded with electrically conductive or magnetically conductive particles. Because an increase in particle density will be observable as an increase in electrical or magnetic conductivity, physical properties such as compression set and density can be measured using such methods.

In another example, sensors are further operable to measure a physical property such as the presence of mold, mildew, fungus, bacteria, or other such materials through use of biologic sensors, electrical sensors, or other types of sensor. Indication of physical properties such as these may be incorporated in addition to sensing other physical properties or alone, as a shoe that has not undergone sufficient compression set for a midsole to be worn out may still be discarded if mildew is present within the shoe material. Because water content in a shoe can be an indication of degradation of the shoe material, and can contribute to mold, mildew, and other such material being present in a shoe, it is desirable in some examples to measure water content of shoe material as an indication of degradation of a shoe, such as by employing an LC resonator having a dielectric layer that changes in relative permittivity as water is absorbed, increasing the resulting capacitance of the LC resonator assembly.

Measurement of material degradation in a shoe is conducted in many examples described herein when the shoe is in a static condition, such as when the shoe not moving and in further examples while the shoe is removed from a user's foot. In other examples, similar degradation measurements may be taken in dynamic conditions, such as when a user is running, walking, jumping, standing on alternating feet, or the like. In dynamic examples such as these, the dynamic condition may be used to measure degradation of the shoe material, such as where running or standing on alternating feet produces a measurable load or impact on the material such that dynamic compression of the foam material or other such physical characteristics can be measured. In further examples, the elastic modulus, viscoelasticity, or force distribution of the shoe are characterized using dynamic measurements, or the dynamic motion is used to determine stride type, to record events such as impacts, strides, steps, or cumulative force encountered by the shoe material. Dynamic activity also enables the degradation sensor, reading apparatus, or other component to harvest energy in some embodiments, such as to power electronics configured to power the degradation sensor, reader, or user interface.

In other examples, sensor measurement may occur during the absence of lower body motion or when the shoes are not being worn. In such examples, shoe degradation monitoring may be based on a change in physical property of the shoe. Key advantages of this measurement method may include simplified and lower cost electronics, sensors, and system design, as reading a static sensor is typically less technically complex than reading a sensor under dynamic conditions. For example, sensor readout time in static examples need not be based on characteristic times of individual motion events, such as strides and jumps. Because many static measures reveal the cumulative effects of dynamic forces over a long measurement or integration time, static measures may provide similarly useful data using lower cost electronics or improved sensitivity relative to dynamic measurements. In addition, static measurement reader electronics are not required to be linked to the shoe's degradation sensors during lower body motion, such as running or jumping, whereas incorporating a dynamic sensor measurement apparatus into the shoe may result in undesirable changes to the shoe mechanics, weight, shoe feel to the user, or increased manufacturing costs. Furthermore, dynamic sensor readings may require robust mechanical connectors, a long range (greater than 5 cm) wireless readout protocol, or measurement error associated with varying human factors or motion styles, contributing to increased cost and decreased reliability of such methods.

Figure 14:
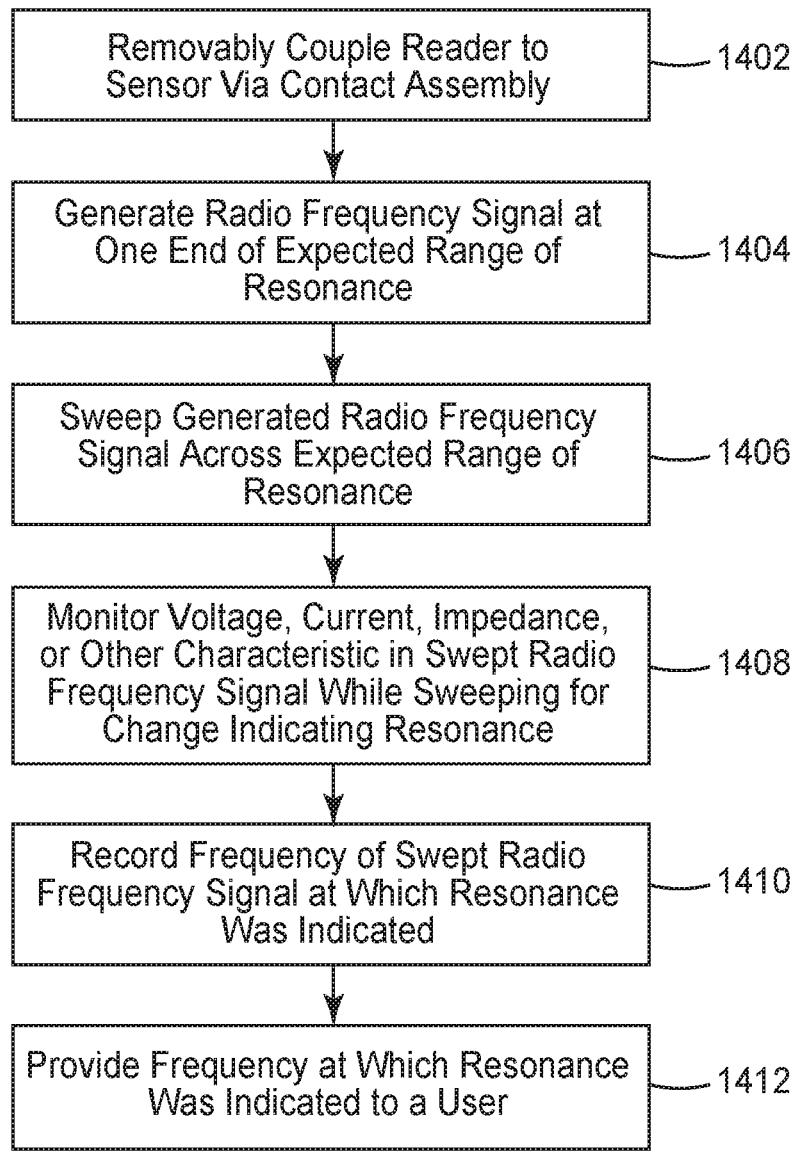
FIG. 14 is a flowchart showing a method of reading a shoe degradation sensor.

FIG. 14 shows a method of reading a shoe degradation sensor, such as those of FIGS. 1-7 and 9. At 1402, a degradation sensor reader is electrically coupled to a degradation sensor, such as using removable anisotropic adhesive, conductive hook-and-loop connectors, inductive loop coupling, friction or clamp conductive connections, or other suitable electrical connection. An electronic circuit in the degradation sensor reader generates a radio frequency signal at 1404, such as using integrated circuit 1004 of FIG. 10. The radio frequency signal sweeps across the expected range of resonance for a degradation sensor incorporating an LC element at 1406, such as in the hundreds of kHz or single digit to tens of MHz range depending on the construction of the LC element. The electronic circuit monitors the current, voltage, impedance, or other such characteristic of the swept radio frequency signal at 1408, monitoring for a change such as a decrease in current when the swept frequency matches the resonance of an LC element nearby. When a significant decrease in current or other such change (such as an increase in impedance or voltage) is observed, the swept frequency is recorded at 1410. This frequency can then be provided to a user at 1414, stored, or otherwise employed as an indication of the resonant frequency of the LC element, and the physical property of any material configured to influence the inductance or capacitance of the LC element, such as the shoe degradation sensors of FIGS. 1-7 and 9.

Although many of the examples provided herein utilize athletic or running shoes as example footwear, methods and systems similar to these examples may also be applied to a wide range of other footwear, such as casual or dress shoes, hiking or work boots, medical or therapeutic footwear such as diabetic shoes, foot braces, ski boots, skates, socks, compression hosiery, or other such footwear. In still other examples, the systems and methods described herein are employed in medical devices such as braces, sporting equipment such as protective pads or helmets, or other such items.

Figure 15:
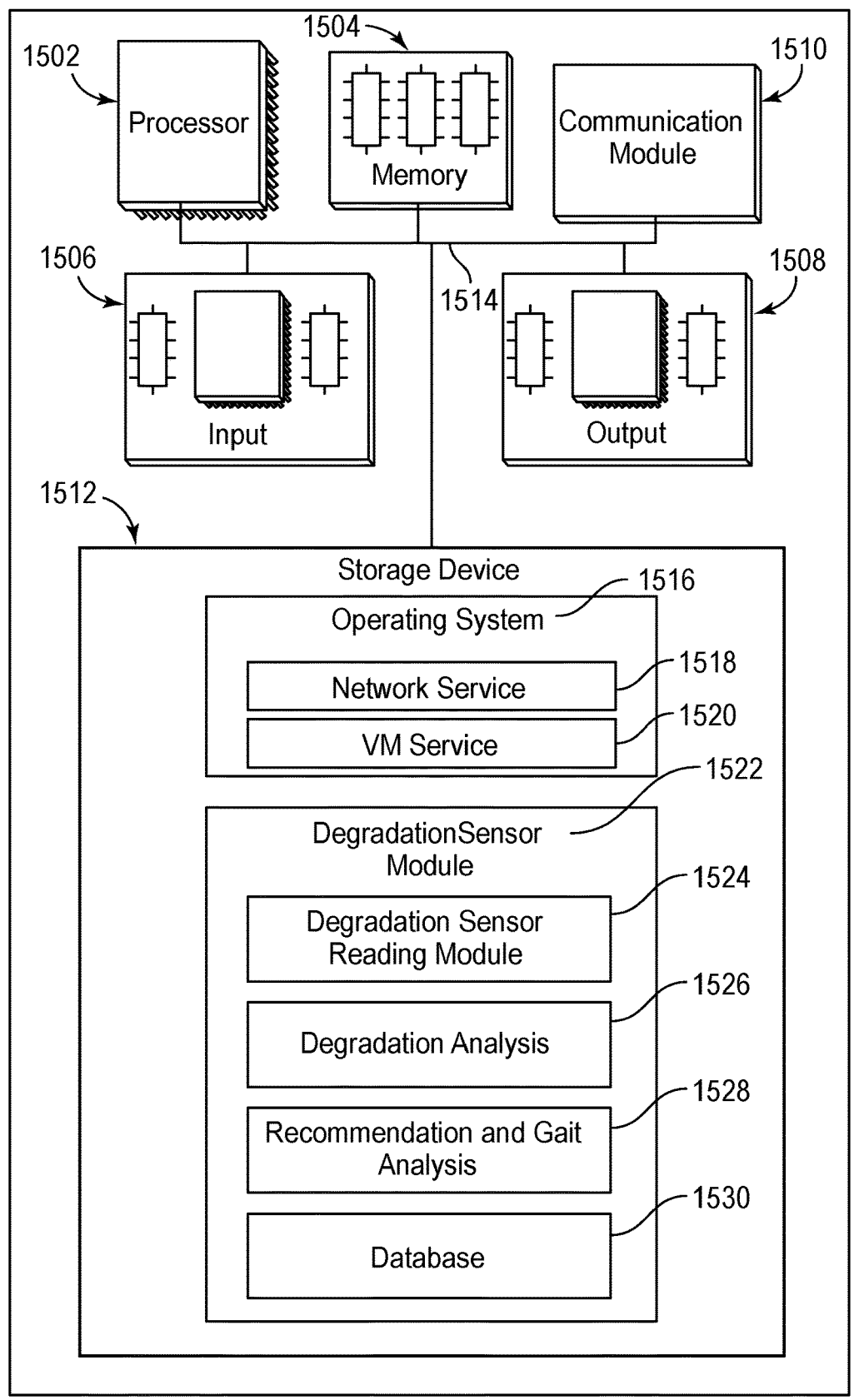
FIG. 15 shows a computerized shoe degradation sensor measurement system, consistent with various examples described herein.

The method of FIG. 14 may be implemented in part using a computerized device, such as a smartphone, kiosk, or other computerized device. Similarly, many of the other methods described herein or parts of such methods, such as recording baseline degradation sensor information for new shoes, can be performed using a computerized system. FIG. 15 shows a computerized shoe degradation sensor measurement system, consistent with various examples described herein. FIG. 15 illustrates only one particular example of computing device 1500, and other computing devices 1500 may be used in other embodiments. Although computing device 1500 is shown as a standalone computing device, computing device 1500 may be any component or system that includes one or more processors or another suitable computing environment for executing software instructions in other examples, and need not include all of the elements shown here.

As shown in the specific example of FIG. 15, computing device 1500 includes one or more processors 1502, memory 1504, one or more input devices 1506, one or more output devices 1508, one or more communication modules 1510, and one or more storage devices 1512. Computing device 1500, in one example, further includes an operating system 1516 executable by computing device 1500. The operating system includes in various examples services such as a network service 1518 and a virtual machine service 1520 such as a virtual server. One or more applications, such as a degradation sensor software module 1522 are also stored on storage device 1512, and are executable by computing device 1500.

Each of components 1502, 1504, 1506, 1508, 1510, and 1512 may be interconnected (physically, communicatively, and/or operatively) for inter-component communications, such as via one or more communications channels 1514. In some examples, communication channels 1514 include a system bus, network connection, inter-processor communication network, or any other channel for communicating data. Applications such as recommendation module 1522 and operating system 1516 may also communicate information with one another as well as with other components in computing device 1500.

Processors 1502, in one example, are configured to implement functionality and/or process instructions for execution within computing device 1300. For example, processors 1502 may be capable of processing instructions stored in storage device 1512 or memory 1504. Examples of processors 1502 include any one or more of a microprocessor, a controller, a digital signal processor (DSP), an application specific integrated circuit (ASIC), a field-programmable gate array (FPGA), or similar discrete or integrated logic circuitry.

One or more storage devices 1512 may be configured to store information within computing device 1500 during operation. Storage device 1512, in some examples, is known as a computer-readable storage medium. In some examples, storage device 1512 comprises temporary memory, meaning that a primary purpose of storage device 1512 is not long-term storage. Storage device 1512 in some examples is a volatile memory, meaning that storage device 1512 does not maintain stored contents when computing device 1500 is turned off. In other examples, data is loaded from storage device 1512 into memory 1504 during operation. Examples of volatile memories include random access memories (RAM), dynamic random access memories (DRAM), static random access memories (SRAM), and other forms of volatile memories known in the art. In some examples, storage device 1512 is used to store program instructions for execution by processors 1502. Storage device 1512 and memory 1504, in various examples, are used by software or applications running on computing device 1500 such as recommendation module 1522 to temporarily store information during program execution.

Storage device 1512, in some examples, includes one or more computer-readable storage media that may be configured to store larger amounts of information than volatile memory. Storage device 1512 may further be configured for long-term storage of information. In some examples, storage devices 1512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1500, in some examples, also includes one or more communication modules 1510. Computing device 1500 in one example uses communication module 1510 to communicate with external devices via one or more networks, such as one or more wireless networks. Communication module 1510 may be a network interface card, such as an Ethernet card, an optical transceiver, a radio frequency transceiver, or any other type of device that can send and/or receive information. Other examples of such network interfaces include Bluetooth, 3G or 4G, WiFi radios, and Near-Field Communications (NFC), and Universal Serial Bus (USB). In some examples, computing device 1500 uses communication module 1510 to wirelessly communicate with an external device such as via public network such as the Internet.

Computing device 1500 also includes in one example one or more input devices 1506. Input device 1506, in some examples, is configured to receive input from a user through tactile, audio, or video input. Examples of input device 1506 include a touchscreen display, a mouse, a keyboard, a voice responsive system, video camera, microphone or any other type of device for detecting input from a user.

One or more output devices 1508 may also be included in computing device 1500. Output device 1508, in some examples, is configured to provide output to a user using tactile, audio, or video stimuli. Output device 1508, in one example, includes a display, a sound card, a video graphics adapter card, or any other type of device for converting a signal into an appropriate form understandable to humans or machines. Additional examples of output device 1508 include a speaker, a light-emitting diode (LED) display, a liquid crystal display (LCD), or any other type of device that can generate output to a user.

Computing device 1500 may include operating system 1516. Operating system 1516, in some examples, controls the operation of components of computing device 1500, and provides an interface from various applications such as degradation sensor software module 1522 to components of computing device 1500. For example, operating system 1516, in one example, facilitates the communication of various applications such as degradation sensor software module 1522 with processors 1502, communication unit 1510, storage device 1512, input device 1506, and output device 1508. Applications such as degradation sensor software module 1522 may include program instructions and/or data that are executable by computing device 1500. As one example, degradation sensor software module 1522 and its degradation sensor reading module 1524, degradation analysis module 1526, recommendation and gait analysis module 1528, and database 1530 may include instructions that cause computing device 1500 to perform one or more of the operations and actions described in the examples presented herein.

Exemplary Embodiments

Embodiment 1

A shoe degradation sensor reader, comprising:
a contact assembly configured to removably electrically couple to a first sensor disposed in or proximate to a material layer of the shoe that changes in at least one physical property with degradation to the shoe, the first sensor configured to indicate the at least one physical property of the material layer thereby indicating a degree of degradation to the shoe;
a reader module operable to query the first sensor via the contact assembly, the reader module operable to measure the at least one physical property of the material via the first sensor; and
a communication module operable to communicate the measurement of the at least one physical property of the material from the shoe degradation sensor reader to an electronic device.

Embodiment 2

The shoe degradation sensor reader of Embodiment 1, wherein the communication module comprises a wireless communication module, operable to communicate with the electronic device via Near-Field Communication (NFC), RFID, Bluetooth, Zigbee, WiFi, Cellular, or other wireless protocol.

Embodiment 3

The shoe degradation sensor reader of Embodiment 1 or 2, wherein the electronic device comprises a user interface device.

Embodiment 4

The shoe degradation sensor reader of any one of Embodiment 1-3, wherein the contact assembly comprises a removable mechanically compliant contact assembly.

Embodiment 5

The shoe degradation sensor of any one of Embodiment 1-4, wherein the contact assembly comprises at least one of inductive coupling, metallized hook-and-loop, conductive adhesive electrical contacts, and mechanically compliant electrical contacts.

Embodiment 6

The shoe degradation sensor reader of any one of Embodiment 1-5, wherein the first sensor comprises an LC (inductor-capacitor) network having a resonant property affected by the at least one physical property.

Embodiment 7

The shoe degradation sensor reader of Embodiment 6, wherein the first sensor resonant property is affected by a change in compression set in the material layer of the shoe.

Embodiment 8

The shoe degradation sensor reader of Embodiment 7, wherein the first sensor resonant property comprises a resonant frequency, and querying the first sensor via the reader module comprises sweeping a frequency source energizing the first sensor and observing at least one of a voltage peak or an impedance peak of the first sensor to identify the resonant frequency.

Embodiment 9

The shoe degradation sensor reader of any one of Embodiment 1-8, wherein the reader module is configured to be removably mounted in the shoe.

Embodiment 10

A shoe degradation sensor assembly, comprising:
a material layer between a foot space and an outer surface of a shoe;
a first sensor disposed in or proximate to the material layer of the shoe, wherein the material layer changes in at least one physical property with degradation to the shoe, the first sensor configured to indicate the at least one physical property of the material layer thereby indicating a degree of degradation to the shoe; and
a contact assembly configured to connect the shoe degradation sensor assembly to a reader module that is operable to query the first sensor via the contact assembly, thereby measuring the at least one physical property of the material.

Embodiment 11

The shoe degradation sensor assembly of Embodiment 10, wherein the contact assembly comprises a removable mechanically compliant contact assembly.

Embodiment 12

The shoe degradation sensor assembly of Embodiment 10 or 11, wherein the contact assembly comprises at least one of inductive coupling, metallized hook-and-loop, conductive adhesive electrical contacts, and mechanically compliant electrical contacts.

Embodiment 13

The shoe degradation sensor assembly of any one of Embodiment 10-12, wherein the first sensor comprises an LC (inductor-capacitor) network having a resonant property affected by the at least one physical property.

Embodiment 14

The shoe degradation sensor assembly of Embodiment 13, wherein the first sensor resonant property is affected by a change in compression set in the material layer of the shoe.

Embodiment 15

The shoe degradation sensor assembly of Embodiment 14, wherein the first sensor resonant property comprises a resonant frequency, and querying the first sensor via the reader module comprises sweeping a frequency source energizing the first sensor and observing at least one of a voltage peak or an impedance peak of the first sensor to identify the resonant frequency.

Embodiment 16

A method of determining a physical property of an article of apparel, comprising:
removably coupling a reader module to a first sensor embedded in or proximate to a material layer of the article of apparel, wherein the physical property of the material layer changes with degradation to the article of clothing; and
measuring the at least one physical property via the reader module, thereby measuring a degree of degradation to the article of apparel.

Embodiment 17

The method of determining a physical property of an article of apparel of Embodiment 16, further comprising wirelessly communicating the measurement of the at least one physical property of the material from the reader module to an electronic device.

Embodiment 18

The method of determining a physical property of an article of apparel of Embodiment 16 or 17, wherein removably coupling comprises coupling using at least one of compliant inductive coupling, compliant metallized hook-and-loop, and compliant anisotropic conductive adhesive electrical contacts.

Embodiment 19

The method of determining a physical property of an article of apparel of claim 16, wherein the first sensor comprises an LC (inductor-capacitor) network having a resonant frequency affected by the at least one physical property, and wherein querying the first sensor comprises determining a resonance peak of the first sensor indicating the at least one physical property by sweeping a frequency source of the reader module coupled to energize the first sensor and observing at least one of a voltage peak or an impedance peak of the first sensor to identify the resonant frequency.

Embodiment 20

The method of determining a physical property of an article of apparel of claim 16, wherein the article of apparel comprises one of a shoe, a medical brace, sporting equipment, and a wrap.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A shoe degradation sensor reader comprising:
a contact assembly configured to removably electrically couple to an LC (inductor-capacitor) tag disposed in or proximate to a material layer of a shoe, the material layer having at least one physical property that changes with degradation of the shoe, the LC tag having a resonant property affected by the at least one physical property of the material layer, the LC tag configured to indicate the at least one physical property of the material layer thereby indicating a degree of the degradation of the shoe;
a reader module operable to:
query the LC tag via the contact assembly; and
measure the at least one physical property of the material layer via the first sensor LC tag; and
a communication module operable to communicate the measurement of the at least one physical property of the material layer from the shoe degradation sensor reader to an electronic device.

2. The shoe degradation sensor reader of claim 1, wherein the communication module comprises a wireless communication module, operable to communicate with the electronic device in compliance with a wireless communications protocol including one or more of a Near-Field Communication (NFC) protocol, a radio frequency identification (RFID) protocol, a Bluetooth protocol, a Zigbee protocol, a Wi-Fi protocol, or a cellular communications protocol.

3. The shoe degradation sensor reader of claim 1, wherein the electronic device comprises a user interface device.

4. The shoe degradation sensor reader of claim 1, wherein the contact assembly comprises a removable mechanically compliant contact assembly.

5. The shoe degradation sensor of claim 1, wherein the contact assembly comprises at least one of an inductive coupling, a metallized hook-and-loop, one or more conductive adhesive electrical contacts, or one or more mechanically compliant electrical contacts.

6. The shoe degradation sensor reader of claim 1, wherein the resonant property of the LC tag is affected by a change in compression set in the material layer of the shoe.

7. The shoe degradation sensor reader of claim 6, wherein the resonant property comprises a resonant frequency, and wherein to query the LC tag, the reader module is operable to:

sweep a radio frequency energy source energizing the LC tag; and observe at least one of a voltage peak or an impedance peak of the LC tag to identify the resonant frequency.

8. The shoe degradation sensor reader of claim 1, wherein the reader module is configured to be removably mounted in the shoe.

9. A shoe degradation sensor assembly comprising:

a material layer positioned between a foot space of a shoe and an outer surface of the shoe;

an LC (inductor-capacitor) tag in or proximate to the material layer of the shoe, wherein the material layer changes in at least one physical property with degradation of the shoe, the LC tag having a resonant property affected by the at least one physical property of the material layer, the LC tag being configured to indicate the at least one physical property of the material layer thereby indicating a degree of the degradation of the shoe; and a contact assembly configured to connect the shoe degradation sensor assembly to a reader module that is operable to query the LC tag via the contact assembly, thereby measuring the at least one physical property of the material layer of the shoe.

10. The shoe degradation sensor assembly of claim 9, wherein the contact assembly comprises a removable mechanically compliant contact assembly.

11. The shoe degradation sensor assembly of claim 10, wherein the contact assembly comprises at least one of an inductive coupling, a metallized hook-and-loop, one or more conductive adhesive electrical contacts, or one or more mechanically compliant electrical contacts.

12. The shoe degradation sensor assembly of claim 9, wherein the resonant property of the LC tag is affected by a change in compression set in the material layer of the shoe.

13. The shoe degradation sensor assembly of claim 12, wherein the resonant property comprises a resonant frequency, and wherein to query the LC tag, the reader module is operable to:

sweep a radio frequency energy source energizing the LC tag; and observe at least one of a voltage peak or an impedance peak of the LC tag to identify the resonant frequency.

* * * * *

UNITED STATES PATENT AND TRADEMARK OFFICE
CERTIFICATE OF CORRECTION

PATENT NO. : 10,820,656 B2  Page 1 of 1
APPLICATION NO. : 16/073886
DATED : November 3, 2020
INVENTOR(S) : Andrew Bonifas et al.

It is certified that error appears in the above-identified patent and that said Letters Patent is hereby corrected as shown below:

In the Claims

Column 22
Line 48, In Claim 1, after "the" delete "first sensor".
Line 66, In Claim 5, insert -- reader --, after the word "sensor".

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*